MELVIN J. WELLS,
INVENTOR

By Spensley & Horn

ATTORNEYS.

METHOD AND APPARATUS FOR MULTI-CHANNEL SEISMOGRAPHIC RECORDING

Filed Oct. 28, 1957 7 Sheets-Sheet 2

MELVIN J. WELLS
INVENTOR.

BY

ATTORNEY

Aug. 29, 1961 M. J. WELLS 2,998,592

METHOD AND APPARATUS FOR MULTI-CHANNEL SEISMOGRAPHIC RECORDING

Filed Oct. 28, 1957 7 Sheets-Sheet 3

INVENTOR.
MELVIN J. WELLS,

BY Spensley & Horn

ATTORNEYS.

MELVIN J. WELLS,
INVENTOR.
BY Spensley & Horn
ATTORNEYS.

INVENTOR.
MELVIN J. WELLS,
BY Spensley & Horn
ATTORNEYS

METHOD AND APPARATUS FOR MULTI-CHANNEL SEISMOGRAPHIC RECORDING

Filed Oct. 28, 1957 7 Sheets-Sheet 6

INVENTOR.
MELVIN J. WELLS,
BY Spensley & Horn
ATTORNEYS.

MELVIN J. WELLS,
INVENTOR.

BY Spensley & Horn
ATTORNEYS.

2,998,592
Patented Aug. 29, 1961

2,998,592

METHOD AND APPARATUS FOR MULTI-CHANNEL SEISMOGRAPHIC RECORDING

Melvin J. Wells, Torrance, Calif., assignor to Western Geophysical Company of America, Los Angeles, Calif., a corporation of Delaware Filed Oct. 28, 1957, Ser. No. 692,657
11 Claims. (Cl. 340—15)

This invention relates to multi-channel recorders and more particularly to an improved method and apparatus for multi-channel seismographic recording.

In making seismographic surveys for geophysical exploration by the well-known reflection method, a record is made of the earth's disturbance produced at a given point by a detonation initiated near the earth's surface at another point. In general, the record shows waves which have traversed paths close to the earth's surface and waves which have penetrated the earth and have been reflected by interfaces between two layers of different properties or characteristics. In many cases several interfaces are present at varying depths and the record will show waves reflected from such interfaces. The amplitude of such reflected waves will vary over a considerable range depending upon the reflection coefficient associated with each interface. For purposes of illustration, in a common arrangement of seismographic exploratory and recording apparatus used for seismographic surveying work a plurality of seismometer or detector groups are disposed in contact with the ground in a preferably straight line at opposed sides of the shot point. A recording unit provided with suitable amplifying and recording means is electrically connected to the detectors to amplify and record the electrical impulses produced by the detectors upon the arrival at each detector group of seismographic waves generated by an explosion at the shot point and reflected from the various underground formations.

The electrical impulses produced by the detector groups are recorded by multi-channel recording means such as magnetic drum or tape recorders or channelized film recorders with a channel corresponding to each detector group. The desirability of being able to apply time origin corrections and time scale calibration into a seismographic record is readily apparent, for example, in introducing "moveout" corrections or corrections due to surface profile of the area being explored. Moveout corrections are necessary since the detector groups are at varying horizontal distances from the shot point and a greater time interval will be required for a reflected wave to reach the outermost detector group than the time interval which is required for the reflected wave to reach an inner detector group from an interface the same vertical distance below each. As the depth of the reflection increases, the time differential required to reach the various detector groups become smaller with the time differential approaching zero as the depth of reflection approaches infinity. In addition to the above moveout consideration, the various detector groups will in general be situated at various elevations so that it will be desirable to make time scale adjustments to reduce all readings to a common horizontal plane. Similarly, origin adjustments of the time scale are often necessary to compensate for varying amounts of near surface weathered material under the different detector groups. In off-shore exploration, such corrections may be required by varying depths of water.

Numerous methods and apparatus have been proposed in the prior art for removing the normal movout time variation from seismic traces and for making other time scale corrections. With the advent of reproducible recording in seismic prospecting a number of methods have been proposed for removing normal moveout by affecting relative shifts in the position of the recording or reproducing means relative to the reproducing or recording medium to produce relative time shifts in the recorded traces. Such reproducing apparatus is shown, for example, in co-pending U.S. Patent application, Serial No. 659,434 for Multi-Channel Recording by H. Salvatori, et al., filed May 15, 1957 and assigned to the assignee of the present application. Such apparatus allows the conversion from a non-corrected time scale record, such as that obtained in the field under the conditions described above, to corrected time scale record by causing time scale shifts in the recording or reproducing heads in each channel of the multi-channel recording apparatus. That is, a multi-channel recorder having means for introducing time origin corrections and time scale calibrations is utilized to play back an uncorrected multi-channel magnetic recording to produce a corrected output from the apparatus. The corrected output is in turn transmitted to suitable apparatus to record a corrected tape or to form a corrected visual record. The corrected visual record may be any one of the many types known to the art such as a variable amplitude record, a variable density record, variable area record, or a combination variable density-variable area record. For purposes of illustration, a corrected visual record in the form of a variable amplitude record will be shown and described throughout this application as the corrected record obtained by means of the present invention.

In multi-channel seismographic recording apparatus, particularly of the type shown and described in the Salvatori, et al. application, supra, a plurality of recording or reproducing heads, each of which defines a channel of the apparatus, are positioned proximate the surface of a rotating drum having a recording medium affixed to the surface thereof. By means of such apparatus, the time scale position of each magnetic head may be varied to achieve time origin corrections and time scale calibration which consists of applying to the time scale $t$, a transformation of the form $T=t—A_n—B_nF(t)$ where T is the transformed time scale of the $n$th channel, $A_n$ is the time origin correction of the $n$th channel, and $B_nF(t)=F_n(t)$ is the time scale calibration function of the $n$th channel. The time delay and calibration system comprises for each channel a magnetic head which is mounted to be movable circumferentially with respect to the surface of the rotating drum. A flexible cable of fixed length is affixed to the head which is normally urged in the direction opposite to the direction in which the cable extends. The cable extends over a static correction means and thence to a dynamic calibration means. The static correction means provides variation of the origin point of the head by a predetermined amount $A_n$. Variation of the origin is affected by varying the initial time scale position of the magnetic head by a predetermined amount from zero time alignment of the head. Similarly, the dynamic calibration means provides time scale movement of the head in accordance with a predetermined function $F_n(t)$ during rotation of the drum.

As is well known to the art, the dynamic calibration or moveout correction for each channel is dependent among other factors upon the distance of the detector corresponding to that channel from the origin of the seismographic disturbance, and the time after the disturbance. That is, relatively large differences in time arise between the various traces due to the fact that the seismic wave detectors are spaced at different distances from the location of the seismic disturbance so that energy reflected from a given horizontal reflecting horizon arrives at the different detectors at different times, resulting in time displacements of corresponding signal portions of the different seismic traces. This time differential is well known in the art as normal moveout and is sometimes referred to as step-out or angularity. As the depth of the reflection increases the time differentials required to reach the various detector groups become smaller with the time differential approaching zero as the depth of the reflector approaches infinity. Thus, the time differential or normal moveout is maximum immediately after the disturbance when the differences in distance of the travel paths to the different detectors from a given reflecting horizon are largest. The exact manner in which the normal moveout varies as a function of the time after the disturbance will depend upon the spacing of the different detectors and the particular velocity function obtained in the survey area. This nonlinear dynamic calibration or moveout correction is made in apparatus such as the apparatus shown and described in the Salvatori, et al. application by spacing the cables connecting the magnetic heads to a pivotal bar at varying distances from a pivot point to produce suitable time scale shifts when the bar is pivoted. In addition, the dynamic calibration function of time which is denoted in the above equation as $F_n(t)$ where $n$ denotes any detector or its respective channel, is obtained by a cam or similar means which causes the pivotal bar to be pivoted in accordance with a particular function of time and accordingly causes the magnetic heads to be moved through their respective distances in accordance with the function.

It will be seen, however, that the time scale cycle of correction is dependent upon the time of the origin of the seismic disturbance, that is, the time of the shot, and since the point of origin or the shot point is not visible upon a magnetic recording obtained in the field, the correlation of the cycle of correction with the zero time point has been difficult by apparatus heretofore known to the art. That is, in the magnetic recording apparatus of the prior art, the normal move-out cycle is in fixed relationship with the tape which is obtained in the field as an uncorrected tape. This fixed relationship is with respect to time and must commence accurately at the time of the shot or at a predetermined time relative thereto. The uncorrected seismic record upon the magnetic tape which has no visual means of detecting the zero time point is mounted upon a rotating drum in a playback apparatus to be transmitted to a recording apparatus in corrected form. When a control cam for introducing the time function $F_n(t)$ is used, the relationship of the time of origin of the control cam to the time of origin of the tape can be adjusted in the prior art only by stopping the machine and by trial and error to coordinate the zero time of both the time correction cycle and the uncorrected tape. For example, it is common in the prior art to correlate the time origin of the tape and the time origin of the correction cycle by transmitting the tape signals to an oscilloscope and visually denoting the time break. It is then attempetd to adjust the control cam zero point to the point at which the time origin of the tape occurs upon the oscilloscope. Such a method is performed by trial and error only and is time consuming and relatively inaccurate since time coordination measured in milliseconds is essential.

In addition, after a time scale corrected seismograph record is obtained by the method and apparatus of the prior art, it is difficult to determine what corrections, both static and dynamic, have been introduced into the corrected tape record since the static and dynamic corrections are superimposed. In order to obtain a corrected seismic record such as a visual variable amplitude record of optimum value it is necessary, after the corrected recording has been made, that it be possible to determine what corrections have been introduced into each channel. That is, it should be possible to separate the static and dynamic corrections which have been made in the record. Also, in apparatus heretofore known to the art of the type discussed it is necessary to replace mechanical components in order to alternate the reproduction of a corrected tape with moveout corrections and an uncorrected tape without moveout corrections. That is, it is necessary to change the time function control cam for each record being reproduced and to remove the cam when no dynamic correction is desired.

Accordingly, it is an object of the present invention to provide an improved method and apparatus for introducing time scale calibration corrections to an uncorrected seismic record, which corrections are automatically correlated with the proper point in time of the uncorrected record which is being reproduction in corrected form.

It is another object of the present invention to provide a method and apparatus for introducing and coordinating such time scale corrections with a minimum amount of time expended in making such corrections.

It is a further object of the present invention to provide a method and apparatus for making time scale corrections in the reproduction of a corrected seismic record from an uncorrected seismic record which involves a minimum amount of skill on the part of the operator of such apparatus.

A further object of the present invention is to provide a method and apparatus for introducing time scale corrections in a multi-channel seismic recording wherein it is possible from the corrected record to determine both the static and dynamic time scale corrections which have been introduced into the record.

Still another object of the present invention is to provide a method and apparatus for reproducing a corrected time scale seismic recording wherein the apparatus used may be inactivated in order to obtain a time scale recording without dynamic time scale correction without the necessity of removing or changing mechanical components of the apparatus.

It is a further object of the present invention to provide a method and apparatus for introducing time scale calibrations and corrections into a multi-channel seismic recording in which the early part of the time scale corrected record which is obtained is reproduced without time scale correction for computations.

A still further object of the present invention is to provide a method and apparatus for introducing the scale calibrations and corrections into a multi-channel field seismic recording during the field recordation.

Another object of the present invention is to accomplish such time scale calibrations and corrections in the field recording or the correction playback automatically and without the interchange of mechanical components in the apparatus.

The novel features which are believed to be characteristic of the invention, both as to its organization and method of operation, together with further objects and advantages thereof, will be better understood from the following description considered in connection with the accompanying drawings, in which a presently preferred embodiment of the invention is illustrated by way of example. It is to be expressly understood, however, that the drawing is for the purpose of illustration and description only, and is not intended as a definition of the limits of the invention.

Figure 4A:
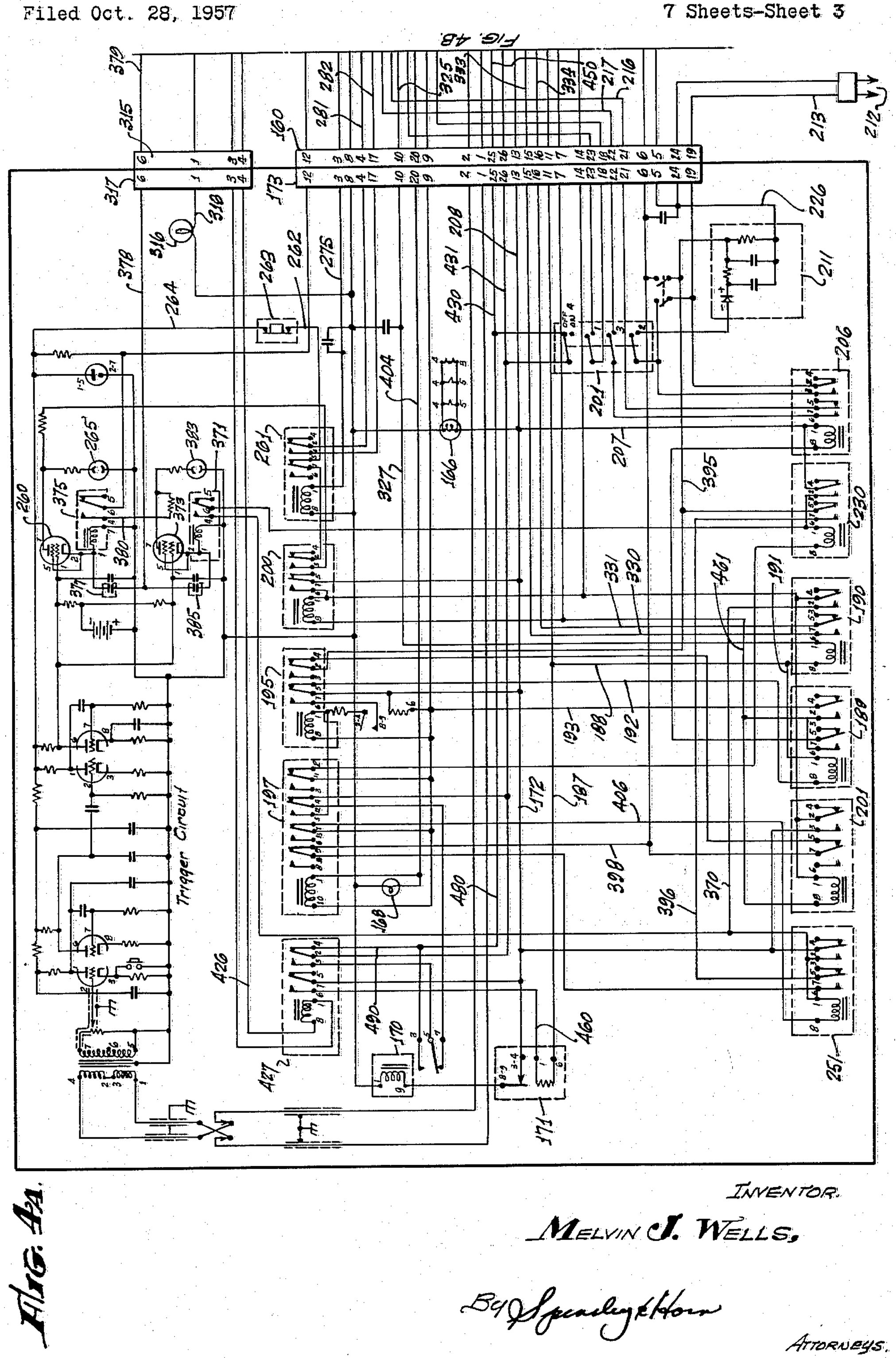
Figure 4B:
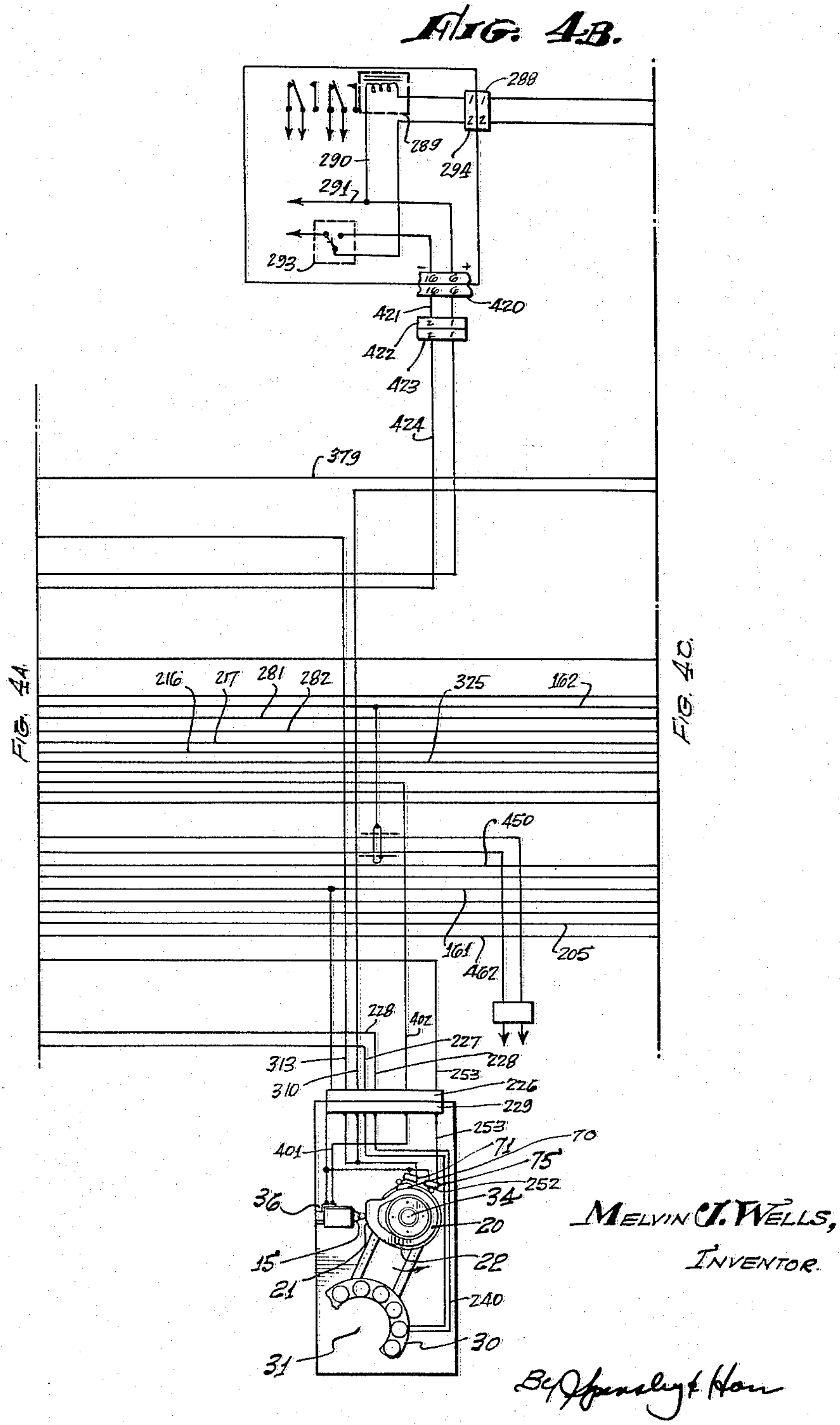
Figures 4B, 4C, 4D:
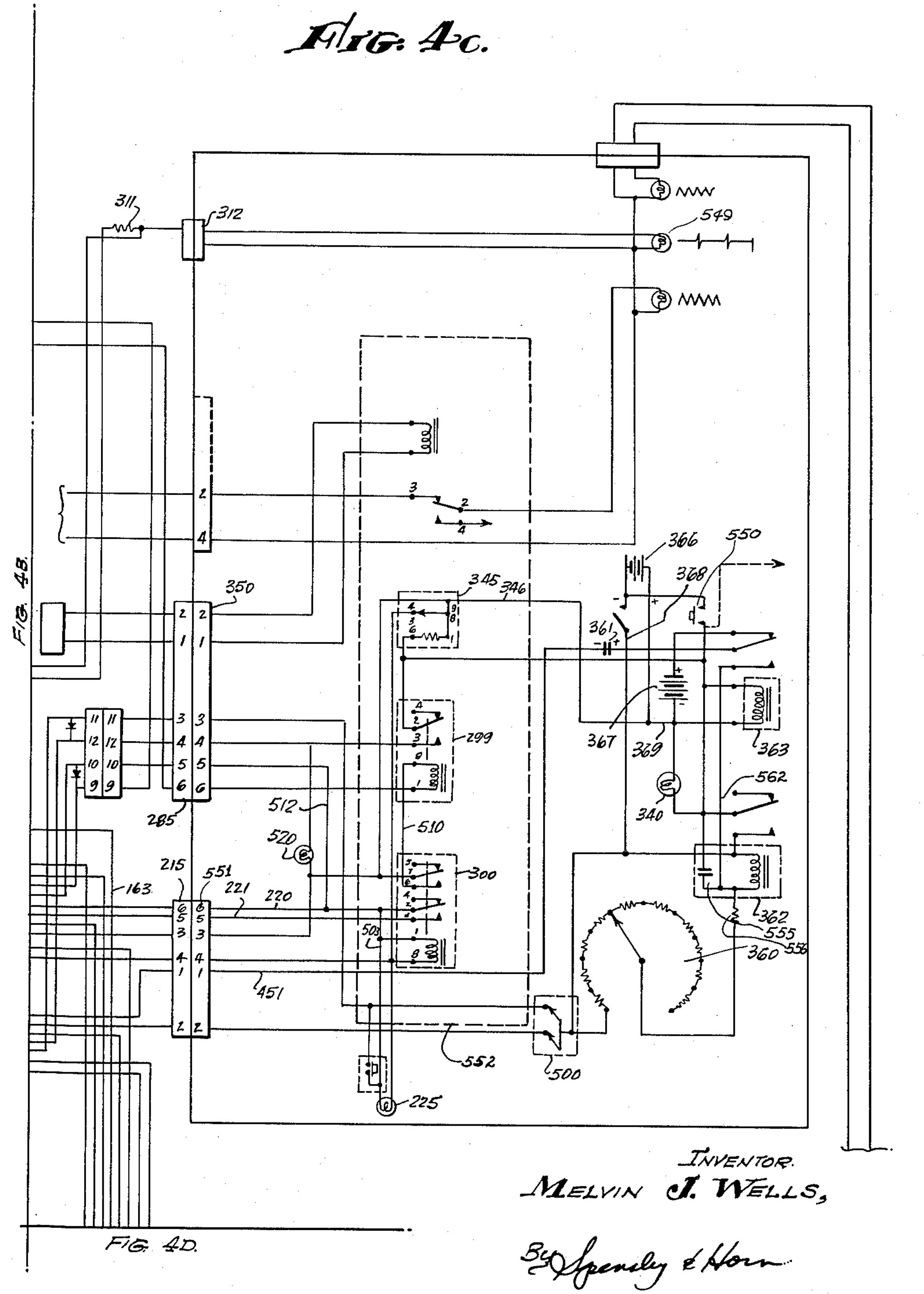
Figures 4C, 4D:
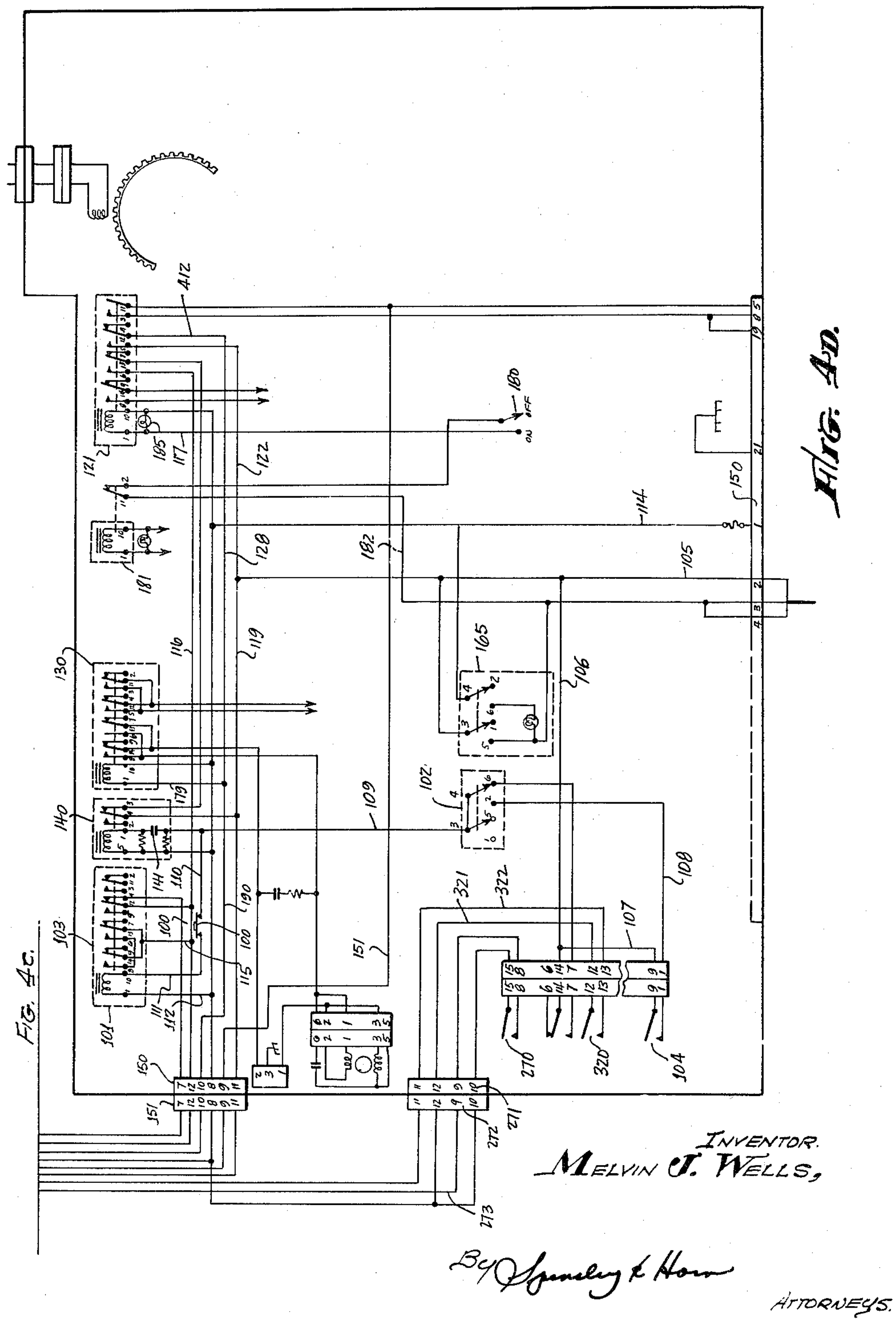
Figure 5:
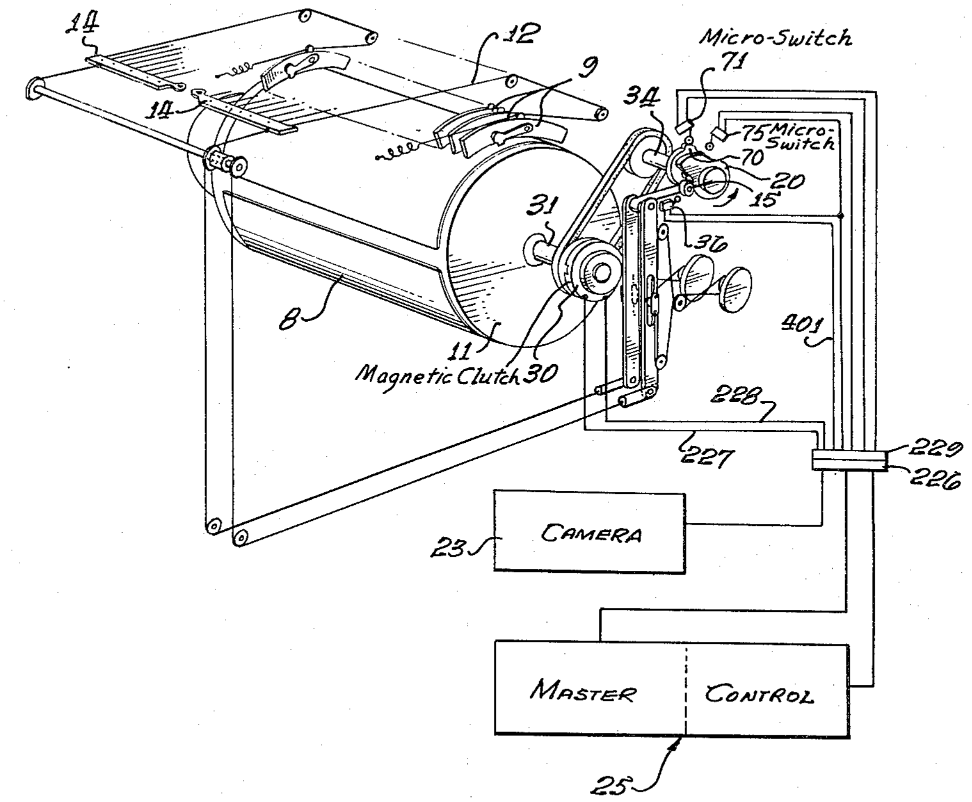

FIGURES 4*a*, 4*b*, 4*c* and 4*d* are the enlarged detailed figures of the circuit; and FIGURE 5 shows the interrelation between the various major components of the present invention.

The present invention provides in combination with an apparatus having means for introducing time scale calibrations to an input signal, means for detecting an arbitrary time origin of the input signal to the apparatus and means for engaging the time scale calibration means at a predetermined time scale relationship to the time origin of the input signal.

Figures 1, 3:
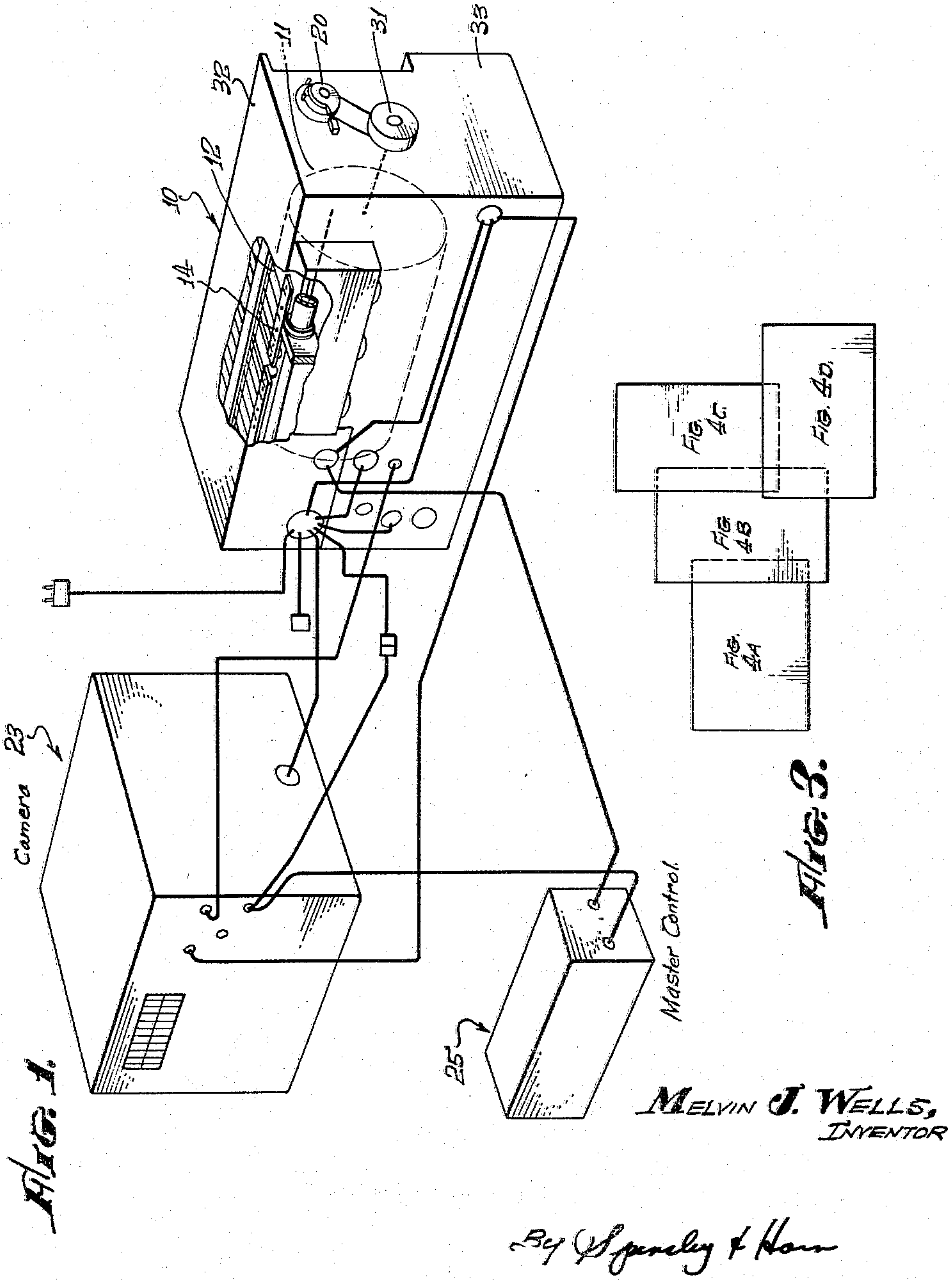
FIGURE 1 is a schematic diagram of the assembly of essential components for producing a corrected visual seismographic record from an uncorrected magnetic tape record in which auxiliary components such as amplifiers, power supplies, and the like are not shown.
FIGURE 3 shows the interrelation of the circuit drawings 4*a*, 4*b*, 4*c* and 4*d* which show the presently preferred embodiment of the circuitry of the present invention.

Referring to the drawings, FIGURE 1 illustrates diagrammatically the presently preferred embodiment of the invention used in conjunction with a multi-channel magnetic reproducing apparatus 10 of the type wherein a plurality of recording or reproducing heads, each of which defines a channel of the apparatus, are positioned proximate the surface of a rotating drum 11 having a recording medium affixed to the surface thereof. The recording medium in this embodiment is a magnetic tape 8 of the type well known to the art upon which a plurality of input signals have previously been recorded. The recorded signals correspond to a plurality of signals received from detectors in response to the arrival at each detector of seismographic waves generated by an explosion at the shot point and reflected by the various underground formations as discussed hereinbefore. The reproducing apparatus is of the type described in the co-pending application of Salvatori, et al., supra, in which the time scale position of each magnetic head is varied to achieve time origin correction and time scale calibration by applying to the time scale $t$ the transformation $T=t-A_n-B_nF(t)$ as discussed hereinbefore. The time delay and calibration system in the illustrative apparatus comprises for each channel a magnetic head 9 which is mounted to be movable circumferentially with respect to the rotating drum 11 and thus with respect to an uncorrected tape record mounted upon the drum in the playback operation. A flexible cable 12 of fixed length is affixed to each head and extends over static correction means (not shown) to a pivotal bar 14. In the embodiment shown two pivotal bars 14 corresponding to opposite sides of the shot point are shown and are similar such that only one will be described with reference to the movement of the heads. The detailed means for mounting the heads with respect to the drum and for connecting the heads to the pivotal bars in order to obtain an initial time scale displacement $A_n$ and dynamic displacement $B_nF(t)$, form no part of the present invention and will be discussed in general terms only to clarify the description and operation of the present invention as adapted to the apparatus as an illustrative embodiment.

The pivotal bars 14 are pivotally moved according to the function $F_n(t)$ during rotation of the drum 11 and thus during time scale movement of the uncorrected magnetic tape record beneath the magnetic reading heads. Motion of the pivotal bar is obtained by connection of the pivotal bar to a cam follower 15, shown in FIGURES 1, 3*a* and 5, which moves the pivotal bar in response to the function imparted by the dynamic correction cam 20. Again, the means for connecting the pivotal bar to the cam follower forms no novel part of the present invention and will not be discussed in detail. A detailed description of one means for connection is shown and described in detail in the Salvatori, et al. patent application, supra. As discussed hereinbefore, the cam surface of the dynamic correction cam 20 is determined by the application in which the apparatus is utilized and the function of the movement to be produced. It should be noted, however, that two positions on the cam are of immediate interest, namely the zero time point 21 of the cam 20 and the zero correction point 22 of the cam. At the zero time position of the cam the moveout correction is maximum as discussed hereinbefore and at a predetermined time after the initiation of the input signals, i.e., after shot time, the correction required for moveout is insignificant and the dynamic correction introduced by the cam is arbitrarily equal to zero.

Referring particularly to FIGURE 4*b*, at time zero the lobe of the cam 20 is at the position at which the cam follower 15 is moved the maximum distance to move the magnetic heads out of alignment by the maximum amount. That is, the pivot bars 14 are rotated toward the front of the unit 10 as shown by the arrows in FIGURE 1. The magnetic reading heads therefore, assume a shallow V or U-shape dependent upon the distribution along the pivot bars 14 with the outermost channels being displaced the greatest amount from a straight line through the pivot points. With the drum rotating clockwise in FIGURE 1 it may be seen that the heads are advanced along the time scale with the maximum advance being accomplished by the outermost channels. These outermost channels correspond to the outermost detectors in the field set-up from which the uncorrected tape record was obtained. As the cam rotates counterclockwise in FIGURES 4*b* and 1 the reading heads are returned at the predetermined rate introduced by the cam to a straight line position, i.e., all heads will be moved to a common time scale position if no static correction is present. At this position the cam is at the zero correction point 22 with respect to the cam follower. A further point to be noted with respect to the dynamic correction cam is that the maximum amount of moveout correction required, i.e., at time zero, is commonly beyond the physical practicability of the cam. Accordingly, the cam is made to have substantially a constant radius for a predetermined period of time, after which the position of the cam follower traces the true moveout correction.

In the illustrative embodiment shown in FIGURE 1, a magnetic tape uncorrected record having impressed thereon a series of signals, as described hereinbefore and discussed in particular detail hereinafter, is mounted upon the drum 11 of the reproducing unit and rotated beneath the magnetic reading heads 9 to serve as an input signal to the respective heads. The output signal as reproduced by the reading heads are transmitted in time scale corrected form from the reproducing unit 10 to a suitable recording apparatus 23 which in this embodiment is a reproducing camera of the type well known to the art which produces a parallel series of visual traces upon an elongated strip of sensitive paper. The paper strip is moved to produce a time scale representation of the variable amplitude signals received from the reproducing apparatus 10 in corrected form.

A sequence control unit 25 in accordance with the present invention is connected to the dynamic correction means of the reproducing unit 10 and to the recording camera 23 in order to correlate the operation of the correction means to obtain a corrected visual seismic record of the type shown in FIGURE 2 in accordance with the present invention as described in detail hereinafter.

It is to be expressly understood that although seismographic exploration is used as an application in which the present invention is particularly desirable, the invention is not limited thereto and may be used in any application of a recording and/or play back apparatus of the type wherein a reproducible recording surface is transported past a detecting transducer in which it is desirable to introduce arbitrary time origin corrections or time scale calibrations. It should also be pointed out that although the means for visually recording the corrected time scale signal is shown and described as a variable amplitude reproducing camera, other suitable recording means of the type known to the art may also be used. For example, the time scale corrected multichannel output from the reproducing apparatus may be recorded visually as a variable amplitude record, a variable density record, a variable area record, or a combination of more than one of this type of records. In addition, the time scale corrected output from the reproducing apparatus may also be reproduced as a non-visual record such as a corrected magnetic tape record. Further, although a multi-channel magnetic recording or reproducing unit is shown as the unit from which the corrected signals are transmitted to the recording unit, recording or reproducing means such as the cam corrected camera disclosed and claimed in co-pending U.S. patent application, Serial No. 646,731, by C. H. Savit for Oscillographic Camera, filed March 18, 1957, and Serial No. 659,435 by H. Salvatori and C. H. Savit for for Variable Delay Line, filed May 15, 1957, both of which are assigned to the assignee of the present application, may of course, be utilized in accordance with this invention. That is, the camera of the Savit application as operated by a cam and the variable delay line apparatus of the Salvatori and Savit application, may be controlled in accordance with this invention, to record original seismic signals or seismic signals reproduced in uncorrected form from a fixed head machine, for example.

Figure 2:
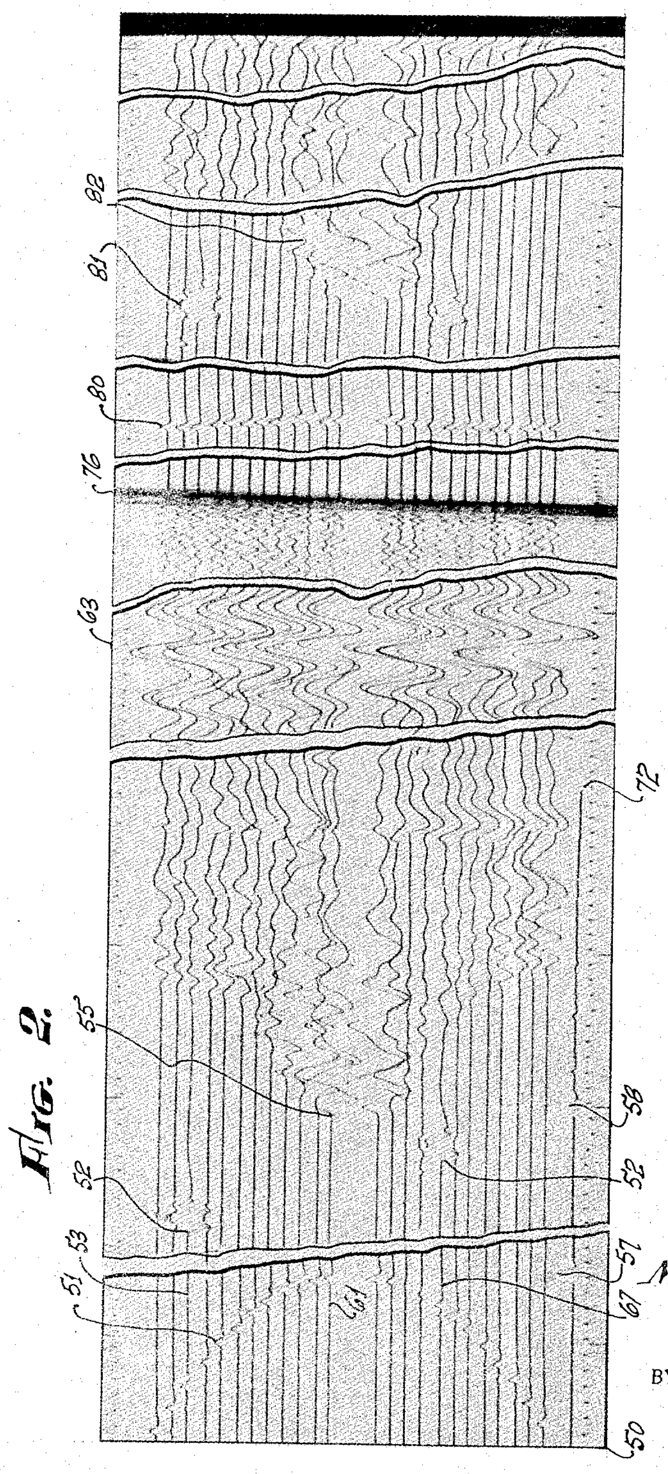
FIGURE 2 is a reproduction of a corrected multichannel seismographic record obtained by means of the present invention.

Referring now particularly to FIGURES 1 and 2 an illustrative corrected visual record as obtained by means of the present invention is shown. In order to clarify the function of the various components and the operation of the present invention a brief description of the mechanical components and operation of the presently preferred embodiment as applied to the corrected record will be made.

As discussed hereinbefore, in this illustrative embodiment an uncorrected magnetic tape record 8 is affixed to the drum 11 of the reproducing unit 10. The tape record has a leading end and a trailing end which are affixed in proper position on the drum 11. The length of the tape record is such that it does not cover the entire circumference of the drum. Circuit means for properly positioning the drum in the load position and rotating the drum through one revolution to attach the tape to the drum and return to the load position, are shown in FIGURE 4 and described in detail hereinafter. Proximate the leading edge of the tape record are a series of head alignment pips which are impressed in each channel upon which a signal is to be recorded. The head alignment pips afford a check upon the pattern of the recording heads of the field recording machine at the particular time the record was made and permit a like pattern to be set up during playback operations. Also, in one or more channels an input signal is recorded which is impressed upon the respective channel simultaneously with the initiation of the seismic disturbance. That is, a timing signal is recorded upon one or more traces in the magnetic record to show the time of shot or the zero time of the record. Following this input signal, termed the time break are the oscillations in each recorded trace caused by the reception of reflected shock waves at the various detectors. Since the time break signal, head alignment, pips and reflected signals are not visible on the tape record, means are provided for detecting the desired time break or other signal and initiating the correction cycle in time relationship to such signal.

Means are provided to activate the correction cam 20 at the proper time scale position. In this embodiment a magnetic clutch 30 is used to couple the cam to the drum in response to an electric signal from the control unit 25. That is, the drum 11 is driven at a constant speed by means well known to the art such as a synchronous motor which is not shown. The rotating shaft 31 of the drum extends through the side wall of the apparatus chassis 32 and rotates within a bearing mounted within the sidewall 33. Affixed to the sidewall is a magnetic clutch of the type well known to the art which can be engaged and rotated in fixed relationship with the drum shaft 31. The magnetic clutch is mounted symmetrically with respect to the drum shaft and can be energized by an electrical signal to become direct connected with the shaft and rotate therewith. The driven portion of the magnetic clutch, i.e., the portion of the clutch which rotates with the shaft only when the clutch is engaged, is connected to the rotating cam 20. The clutch may be connected with the cam means to drive the cam by methods known to the art. Thus, it may be direct connected, or connected through a belt or driving chain. In the embodiment shown, a belt drive is used. In this embodiment a one to one ratio is used between the clutch pulley and cam shaft pulley such that the cam 20 rotates at the same angular rate as the clutch and consequently at the same angular rate as the drum.

Thus, prior to operation of the apparatus to record a corrected record the proper cam for the given application is selected and is mounted and indexed upon the cam shaft 34 with the cam follower 15 near a position of minimum diameter of the cam. Static corrections for each channel are introduced into the reproducing unit by displacing each head by a predetermined time scale amount A*n* to compensate for surface profile or near-surface weathered material under the different detectors.

As described hereinbefore the drum 11 is caused to rotate through one revolution in order to load the tape upon the drum after which the drum stops at the load position for the commencement of a playback cycle. The operator then initiates the entire playback operation by closing the tape reproduce switch. During the revolution of the drum 11 from the load to the operate position, the magnetic clutch 30 is energized, by means of electrical circuitry described hereinafter, to rotate with the drum and to cause rotation of the correction cam 20. The clutch remains energized and continues to rotate during the completion of the load revolution of the drum or until the cam reaches the time zero position or the position of maximum moveout correction. That is, referring to FIGURES 1 and 4*b*, the cam 20 rotates until the zero time point of the cam is in contact with the cam follower. As shown in FIGURE 4*b*, as the cam follower is moved to its maximum displaced position by the maximum diameter of the cam, a first microswitch 75 is opened in a manner to be hereinafter explained to de-energize the magnetic clutch 30. The cam is then stopped and held with a mechanical brake at this maximum moveout position. Appropriate indicating means such as the cam maximum indicator light 316 of FIGURE 4*a* can be utilized to show that the cam has been stopped at the maximum correction position. Thus, as the drum rotates to the operate position, the cam is moved automatically to the time zero position of the recording cycle and stopped. The opening of the first micro-switch 75 also resets detecting means in the control unit 25 which are thyratrons in this embodiment as shown in FIGURE 4*a*, and clears various relays to the proper positions as described in detail hereinafter.

The drum 11 continues to rotate and the leading end of the uncorrected tape passes beneath the magnetic reading heads. As the leading end of the uncorrected tape passes beneath the magnetic heads the camera start circuit is energized by the control unit circuitry and the camera begins to operate in a recording cycle. Thus, the sensitive strip is set in constant speed movement to record photographically the amplitude of the signals transmitted from each reading head in the reproducing unit. Indicating means are provided to show that the camera is in operation. The camera will continue to operate for a predetermined period of time which is governed by the setting of the record limiter switch as described hereinafter. The drum is therefore rotating, the reading heads are each transmitting the amplitude of the signal passing beneath the respective head, and the amplitude is being recorded in visual form upon the time scale corrected record. Thus, referring particularly to FIGURE 2, the drum 11 and camera 23 begin the cycle of recording rotation at the time point 50 on the corrected visual record shown. The first signals to appear in the tape record and to be reproduced upon the visual record are the head alignment signals which appear as a series of head alignment pips 51 on the corrected record. As discussed hereinbefore, the head alignment signals are impressed simultaneously upon each data trace to indicate the time scale pattern of the heads in the field recording setup and should occur as a straight line across the uncorrected tape if the same pattern is used. As shown in FIGURE 2, the head alignment pips 51 are out of time scale alignment by the amount of static correction A*n* set into each channel and by the maximum amount of dynamic, or moveout, correction since the dynamic correction cam is at the maximum correction position in anticipation of the moveout which will appear in the reflections at the early part of the record. Thus, the head alignment pips give a record of the total time scale displacement of each reading head at the start of the correction cycle and the pips assume the shallow U or V-shape described hereinbefore.

The illustrative tape record and resulting corrected visual record shown in FIGURE 2 contain twenty-four data traces corresponding to twelve detectors to each side of the shot point in the seismic surveying field setup. As previously indicated, one or more traces can be selected in the tape record to receive a signal corresponding in time to the time of the shot. Thus, in the illustrative record of FIGURE 2 such time breaks 52 are impressed upon the third data trace 53 and the seventeenth data trace 67 of the record. As shown in FIGURE 2 the time breaks 52, although occurring at the same time on the tape record, do not correspond in time on the corrected time scale of the corrected record. That is, the reading heads from which the third and seventeenth trace are recorded have been displaced in time by the amount indicated by the head alignment pips 51, and are thus recorded at displaced times rather than true times. Means are provided by the present invention for activating the correction cycle at time zero or at any predetermined time relationship thereto. Accordingly, the correction cycle can be commenced by the time break 52 in either channel 53 or 67, or can be commenced from a signal received in any channel designated as the control trace. For example, in the record of FIGURE 2, it is desired to start the dynamic correction when the first direct shock wave is received at one of the two innermost detectors in the field setup, i.e., one of the two detectors at which the moveout correction is minimum. This time is the most suitable at which to initiate the normal moveout function on the particular record shown. Thus, the twelfth data trace is selected in this illustration as the control trace from which the correction cycle is to be initiated. It should be noted that by means of the present invention an auxiliary trace can be recorded which receives only a head alignment signal and a time break signal. This auxiliary trace can then be used to detect the time break at the true time and can be used as the control trace of the record. The use of such an auxiliary control trace allows the adjustment of a relationship between the time break, or shot time, and subsequent happenings in time by adjusting the position of the head in the auxiliary channel.

The means used in the present embodiment for detecting the desired time break is two thyratrons 260 and 373 shown in FIGURE 4*a* and described in connection with the detailed description and operation of the circuitry hereinafter. Since a head alignment pip 51 always occurs prior to the selected signal 55 in the control trace it is necessary that the correction cycle be initiated with relation to the second signal received. The second signal detection is accomplished in this embodiment by the use of two thyratrons. Thus, the head pip thyratron 260 is fired by the head alignment signal 51 in the control trace 61 and the firing is indicated by a signal 57 on an indicator or monitor trace 60 being recorded as an auxiliary trace. Firing of the first, or head pip, thyratron 260, by appropriate circuitry described hereinafter, will "arm" the second or time break thyratron 373 by placing it in the condition at which it will be fired by the next signal which is received from the control trace. Thus, as the signal break 55 in the control trace passes beneath the reading head the signal is received by the time break thyratron which is fired to energize the magnetic clutch 30 which has been de-energized since the cam reached the maximum correction position. The magnetic clutch is engaged substantially instantaneously at the time of the firing of the time break thyratron and the correction cam is set into rotation. The second signal 58 on the indicator trace 60 indicates the simultaneous firing of the thyratron and engagement of the cam to commence the dynamic corrections. The drum 11, the cam 20 and the camera 23 are now moving in unison.

At the occurrence of the signal in the innermost detector trace 61 the data signals 59 commence being received in all data traces corresponding to reflection signals received at the detectors. The record shown in FIGURE 2 is partial only and shows only the portion of the record corresponding to the occurrence of the events in the correction cycle. However, after engagement of the cam 20 and commencement of the recording cycle, the reproducing unit and camera unit continue to operate to record the signals transmitted in corrected form. An example of a reflection received and recorded with proper time scale corrections is shown at time point 63 in FIGURE 2.

As noted hereinbefore, it is both physically impractical and generally unnecessary to construct a cam which introduces the true moveout at the very start of the record, i.e., substantially at time zero. Accordingly, the correction cam 20 is constructed to introduce a constant moveout correction until the time at which the moveout displacement introduced by the cam corresponds to the true moveout correction required. By indexing the zero time point 21 of the cam 20 with respect to an auxiliary cam 70, which rotates with the dynamic correction cam 20, the time after time zero at which the dynamic cam 20 reaches the true moveout correction is indicated on the indicator trace. That is, a cam intercept microswitch 71 is positioned to follow the surface of the auxiliary cam for a length of time determined by the indexing of the correction cam and the relative position of the two cams. Thus, the auxiliary cam is positioned relative to the time zero point 21 of the correction cam such that the surface of the auxiliary cam upon which the intercept microswitch 71 is supported passes beneath the microswitch at the predetermined time at which the correction reaches a true value. The microswitch then opens and through appropriate circuitry described hereinafter, discontinues the recordation of the correction trace 60 and the trace is discontinued. The instant at which the correction trace ends 72 on the record indicated the time at which the dynamic cam function has reached a true value with respect to time. At this point the cam is operating in its active cycle and is introducing the required moveout correction.

The cam 20 then continues to rotate until the zero correction position of the cam 20 comes beneath the cam follower. At this time the correction for moveout has become insignificant and the magnetic heads have been moved back to the time scale position at which only the static correction is present in each reading head. As the cam reaches this zero correction position a zero correction microswitch 36 is opened by the cam follower 15 and the magnetic clutch is de-energized, thus disconnecting the clutch 30 and cam 20. The cam 20 will remain in this position during the remainder of the recording or play back cycle.

The drum 11 and camera 23 continue to operate until the camera has operated for the length of time set into the record limiter setting of the camera unit. At this predetermined time the camera is automatically shut off as shown at position 76 in FIGURE 2. At this point 76 the recordation of the time scale corrected signal traces has been completed.

The drum continues to rotate, however, and at the trailing end of the magnetic tape the control unit is reset for operation of the camera. As the leading end of the tape passes beneath the reading heads the camera control circuit is again energized and the camera commences operation. The correction cam, however, remains at the inactive or zero correction position.

Thus, as the head alignment signals pass beneath the reading heads they are reproduced as head alignment pips 80 without the presence of dynamic corrections as at 51. The head alignment pips accordingly appear in a straight line except for the displacements due to fixed, static corrections. As the drum and camera continue to operate the time break signals 81 occurring in channels 53 and 67 and the first direct seismic signals in the traces are again reproduced as signal traces without the dynamic corrections. As the first breaks 82 are recorded the master control unit 25 is again activated and causes the camera control circuit to be de-energized. The camera is thus turned off and the corrected record shown in FIGURE 2 is ended. As the camera is de-energized it in turn de-energizes the drum circuit causing the drum to complete the revolution and stop in the load position.

Thus, a complete corrected record, together with the head alignment pips 80 and the beginning of the signal traces which are uncorrected for moveout are recorded. The portion of the record of FIGURE 2 beyond the corrected trace is particularly useful in allowing the observation or measurement of the fixed static corrections which were present throughout the corrected record and to measure any necessary quantities that may be necessary in the first break region 82 of the record.

The apparatus has accordingly completed a correction recording cycle and is in the initial condition at which it is ready for the unloading of the now reproduced tape and the loading of a new tape.

Referring now to FIGURE 3 there is shown the presently preferred embodiment of a circuit to carry out the sequence of operations hereinbefore discussed. The various detailed sections shown in dotted lines in FIGURE 3 have been enlarged in four separate FIGURES, 4*a*, 4*b*, 4*c* and 4*d*.

Referring to FIGURE 4*d*, there is shown an illustrative circuit which may be used as the recording control and drum drive circuit. The load and reproduce functions are completely separate when using a tape transport equipped for normal moveout. The isolation of these two functions is accomplished by the use of a push-to-load switch 100 and a load relay 101 in a manner hereinafter to be explained.

If the tape drum 11 is resting in the load position and toggle switch 102 is set in the load position, i.e. (contact arms 3 and 4 make contact with contacts 1 and 2 of switch 102), a momentary actuation of the push-to-load switch 100 will cause the drum 11 to make one complete revolution and stop again in the load position to permit the operator to load or unload the magnetic tape.

The operation of the load function begins when the push-to-load switch 100 is closed. If the load-operate toggle switch 102 is in the load position as previously discussed when the microswitch cam comes around to the proper position to close the contacts 1 and 9 of load microswitch 104, load relay 101 will thus become energized by application of 12 volts to pin 10 thereof. This may be seen by tracing lead 105 which is connected to a +12 volt power supply through plug 150, through leads 106 and 107, through the closed contacts of microswitch 104, through lead 108 and through load-operate toggle switch 102, contacts 2, 4 and 3, lead 109, lead 110, push-to-load switch 100 and lead 111. The other side of the coil of load relay 101, i.e., pin 1 is always connected to a −12 volt reference through lead 112, lead 113, and lead 114, to −12 volt power supply connected to plug 150. Upon energization of load relay 101 all of its contact arms transfer to the left, thus arm 14 makes contact with contact 8. At this time contact 8 of relay 101 is at +12 volts as it is strapped to contact 10 of the coil of the relay. As contacts 6 and 8 are also strapped together, arm 13 will also have +12 volts applied thereto. The +12 volts on arm 13 will be applied through lead 115, lead 116 and lead 117 to pin 1 of the coil of reproduce relay 121, thus energizing the same and causing all of its contact arms to transfer to the left. Arm 12 of relay 121 will thus have 12 volts applied thereto through contact 5 which is connected through leads 122 and 105 to +12 volts. The +12 volts on arm 12 will thus apply +12 volts to energize motor relay 130 through leads 128 and 129. The energization of the motor relay 130 will cause the drum 11 to begin to rotate. The drum 11 will, with switch 102 in the load position, make but one revolution and stop. It will stop upon the de-energization of motor relay 130 which will be affected in the following manner:

When the cam operated load microswitch 104 is again closed upon rotation of cam 20, +12 volts will be applied to stop relay 140 as lead 109 will have +12 volts applied thereto in the same manner as described with respect to the energization of load relay 101. This will cause a charging of capacitor 141 momentarily opening arm 4 and contact 3 of relay 140, thus opening arm 13 and contact 6 of reproduce relay 121, removing the voltage from reproduce relay 121 to thus de-energize motor relay 130 causing the drum to stop rotating.

The operation of the circuit of FIGURE 3 will now be explained with the automatic moveout switch being on. Pin 8 of plug 150 is at −12 volts through leads 113 and 114 being connected to the −12 volt power supply as previously described. Pin 11 of plug 150 is at +12 volts through lead 105 and 119. Finally, pin 9 of plug 150 is at +275 volts through lead 151 which is connected to pin 5 of plug 150 which is in turn energized by a 275 volt power supply, not shown. Plug 150 connects through a cable to plug 151 which is associated with the automatic cam control unit which is shown in detail in FIGURE 4*a*. Thus, −12 and +275 volts are applied respectively to pins 13, 8 and 12 of plug 160 associated with the automatic control unit circuit through leads 161, 162 and 163 respectively.

Thet following conditions should now be established in the cam control unit. The tube filaments should be energized by flipping of toggle switch 165 shown in FIGURE 4*d* to the "on" position. Power circuit lamp 166 of FIGURE 4*a* should be on and the cam zero indicator light 168 will also be on if the cam 20 is set in the zero position. Relay 170 of FIGURE 4*a* will be energized through contacts 3 and 4 of relay 171 which are connected to −12 volts which appears at pin 13 through lead 172 connected to power plug 173. In the recording control and drum drive section 4*d* on the tape transport circuit the spring loaded reproduce switch 180 is first momentarily manually actuated, thus +12 volts is applied to pin 1 of reproduce relay 121 through switch 180 and pins 2 and 11 of relay 181, from lead 182 which is connected to +12 volt power supply, now shown. At this time reproduce light 185 will be "on" indicating that the reproduce relay 121 is energized. Pin 6 of relay 121 is at +12 volts and pin 12 of plug 151 is also at +12 volts and 12 volts is applied through contacts 4 and 12 of load relay 101 to pin 7 of plug 150. Now the spring loaded reproduce switch 180 is manually released. Relay 121 remains energized as 12 volts is applied through contacts 3 and 4 of stop relay 140 and then through contacts 13 and 6 of reproduce relay 121 to pin 1 of reproduce relay 121. This also keeps +12 volts on the pins 7 and 12 of plug 150. Contacts 5 and 12 of relay 121 applies +12 volts to pin 1 of motor relay 130 starting the drum rotating. This +12 volts is also applied to pin 10 of plug 150 through lead 190.

The following new conditions are now established in the cam control unit circuit of FIGURE 4*a*. Pins 7, 9 and 11 of plug 173 are now at +12 volts. The +12 volts on pin 1 which goes to pin 6 of relay 171 through lead 187, and pin 8 of relay 190 through lead 188 and pin 1 of relay 189 through lead 191. Relay 189 is closed as −12 volts has previously been applied to pin 8 of relay 189 through lead 192 which is coupled to pins 7 and 5 of relay 195. The +12 volts on pin 9 of plug 173 is applied to pin 2 of relay 189, pin 6 of relay 196, pins 10, 11 and 13 of relay 197, and pin 8 of relay 195. The +12 volts on pin 7 of plug 173 is applied to pin 8 or relay 200, pin 8 of relay 201 and pins 3 and 6 of relay 189. Since relay 189 is closed pins 2 and 3 of this relay maintain +12 volts on pin 7 of plug 173 thereby feeding +12 volts back to pin 12 of plug 151, thus maintaining relay 121 closed. Since load relay 101 is not closed, pins 4 and 12 of this relay apply +12 volts to pin 7 of plug 150, then through lead 205 to pin 11 of plug 160.

When relay 189 is closed, pins 6 and 7 thereof apply +12 volts to pin 8 of relay 206. Since pin 1 of relay 206 has −12 volts through leads 207 and 208 it therefore closes. Pins 2 and 3 of relay 206 apply 110 volts 60 cycle A.C. through pin 2 of the automatic moveout switch 210 to clutch D.C. power supply 211 which is connected to 110 volt A.C. source 212 through lead 213. Pins 6 and 7 of relay 206 short circuit pins 21 and 22 of plug 173 through pin 3 of the automatic moveout switch 210. Pins 21 and 22 of plug 173 are connected to pins 5 and 6 of plug 215 associated with the automatic tape playback section circuit which controls the camera 33 of FIGURE 1. Pins 6 and 7 of relay 206 short circuit pins 21 and 22 of plug 173 which are connected to pins 5 and 6 of plug 215 through leads 216 and 217 respectively. Pins 5 and 6 are connected through leads 220 and 221 to camera close relay 300 of FIGURE 4*b*. This arms the camera circuit and turns on arming light 225 on the front panel of the camera.

The drum 11 is now rotating. The clutch power supply 211 supplies the negative D.C. clutch voltage to pin 5 of plug 173 of the automatic cam control unit through lead 226 to pin 5 of plug 160 through lead 227. The positive D.C. clutch voltage is applied to pin 7 of relay 230 of the automatic cam control unit. This positive voltage is applied through pins 2 and 4 of relay 195, pins 5 and 7 of relay 201, to pin 6 of plug 173 and through plug 160 to pin 6 and lead 228 to the clutch 30 through pin 6 of plug 229 and lead 240. The clutch 30 is now energized and the correction cam 20 is driven from zero towards maximum moveout.

Contacts 5 and 7 of relay 201 of the automatic cam control unit also apply a positive voltage through contacts 9 and 14 of relay 197 to pin 6 of relay 251 of the cam control unit.

When the correction cam 20 reaches a predetermined maximum point, microswitch 252 on the moveout side of the tape transport closes. (For convenience of illustration and explanation the microswitch 252 is shown in FIGURE 4*b* on the correction cam side of the tape transport in a position directly behind the microswitch 75 to indicate that these microswitches are simultaneously actuated.) One side of microswitch 252 goes directly to −12 volts through lead 253, pin 2 of plug 229, pin 2 of plug 226 and lead 253. When microswitch 252 closes, −12 volts is applied to pin 2 of plug 229, then through lead 253 to pin 14 of plug 160 and finally to pin 14 of plug 173. Pin 14 of plug 173 applies this −12 volts to pins 1 and 6 to relay 200 of the automatic cam control unit, pin 2 of relay 190, and pins 1 and 2 of relay 201. Since pin 8 of relay 200 and pin 8 of relay 201 are at +12 volts relay 22 and relay 201 are closed. Relay 200 and relay 201 are now latched by applying −12 volts to pin 1 of relay 200 and relay 201 through pins 6 and 7 of relay 200. Pins 2 and 3 of relay 200 apply a positive voltage to pin 7 of pip thyratron 260 through pins 5 and 7 of relay 261 through lead 262, reset button 263 and lead 264. Head pip thyratron light 265 is then illuminated. Since relay 201 is energized, pins 5 and 7 thereof are opened removing the positive voltage from the clutch, stopping the cam 20 at maximum moveout and engaging a mechanical cam holder brake, not shown.

The following conditions now exist: the filament switch 165 is in the on position, the automatic moveout switch 210 is in the on position, the reproducing light 185 is on, the drum 11 is rotating, the correction cam 20 is stopped at maximum moveout and the camera 23 is armed as indicated by light 225.

When reset microswitch 270, which may be seen in FIGURE 4*d*, of the tape transport is actuated by the cam 20 near the end of the first quarter of the drum revolution, −12 volts is applied through pin 9 of plug 271, pin 9 of plug 272, lead 273 to pin 3 of plug 160, pin 3 of plug 173 to lead 275 of the automatic cam control unit. This −12 voltage originally came from pins 10 and 12 of plug 271 which is connected to the −12 volt power supply. Since pin 3 of plug 173 of the cam control unit is at −12 volts this voltage is applied to pin 1 of relay 261 and as pin 8 of relay 261 is at +12 volts this relay closes. Since relay 261 is now energized, pins 5 and 7 thereof are open thereby opening the D.C. voltage applied to the pip thyratron plate circuit through lead 264 and contacts 2 and 3 of relay 200. Contacts 2 and 3 of relay 261 short circuit pins 4 and 7 of plug 173. This thereby shorts pins 9 and 10 of plug 280 through leads 281 and 282. Since pins 9 and 10 of plug 280 are shorted, −6 volts is applied from plug B associated with the automatic tape playback section of the camera circuit through pin 5 of plug 285 through lead 286 to pin 1 of plug 288 on the seismic master control chassis 25. Thus, the −6 volts is applied directly to the automatic reset relay 289 of the seismic master control. The other side of this relay is tied to +6 volts through leads 290 and 291. Therefore, relay 289 closes resetting the master control. Since the master control is reset, master control relay 293 applies −6 volts to pin 2 of plug 294, and pin 2 of plug 288. This −6 volts is applied through lead 295 to pin 6 of plug 285 of the automatic tape playback circuit in the camera as may be seen in FIGURE 4*a*. This −6 volts is then applied to pin 1 of relay 299. Pin 8 of relay 299 is at +6 volts as pins 6 and 7 of relay 300 of the automatic tape playback circuit are closed.

When reset microswitch 270 of FIGURE 4*d* opens, relay 261 of the automatic cam control unit of FIGURE 4*d* is de-energized which opens pins 2 and 3 of this relay. This in turn opens the automatic reset relay 289 in the master control and applies B+ to pip thyratron 260 through pins 2 and 3 of relay 200, thus arming the master control. Contacts 5 and 7 of relay 261 are closed thus applying the B+ through pins 2 and 3 of relay 200 to pip thyratron 260 lighting the indicator light 265 and arming the thyratron 260. When the correction cam 20 is re-cocked from zero moveout to maximum moveout and it reaches the maximum position, microswitch 71 which may be seen in FIGURE 4*b* is closed. This applies −12 volts to pins 7 and 9 of plug 229.

Pin 7 of plug 226 applies −12 volts through lead 310 and resistor 311 to plug 312 connected to the camera 23. This −12 volt deflects the galvanometer on camera paper indicating the correction cam is at a maximum. Pin 9 of plug 226 also applies −12 volts through lead 313 to pin 1 of plug 315 of the cam control unit, thereby lighting the cam maximum light 316 which is connected to plug 317 through lead 318.

As the tape drum 11 starts into the first complete drum revolution, camera start microswitch 320 (see FIGURE 4*d*) in the tape transport motor compartment closes. One side of this microswitch 320 is tied directly to −12 volts through pin 12 of plug 271 through lead 321. When this switch is closed −12 volts is applied to pin 11 of plug 271 through lead 322. This −12 volts is applied through lead 325 to pin 10 of plug 160 of the automatic cam control unit. Pin 10 of plug 173 thus, through lead 327, applies −12 volts to pin 1 of relay 190 in the automatic cam control unit. Since pin 8 of relay 190 was previously at +12 volts by closing of the reproduce switch 180, relay 190 is energized. Pins 6 and 7 of relay 190 are closed thus shorting pins 15 and 16 of plug 173 through leads 330 and 331. Pins 15 and 16 of plug 173 connect through pins 15 and 16 of plug 160 through leads 333 and 334 to pins 3 and 4 of camera plug 285. This places a short circuit across pins 3 and 4 of camera plug 285 and since pin 3 goes directly to −6 volts in the camera this voltage is also applied to pin 4. At this point the tape start light 340 (see FIGURE 4*b*) illuminates. Since relay 299 of the camera control circuit is closed contacts 2 and 3 thereof apply −6 volts to pin 6 of thermal relay 345 and to the −6 volt camera control line 346. As the camera control line receives this −6 volts, the camera motor runs and starts the moveout corrected paper record. Since pin 1 of relay 345 is at +6 volts the relay will open after approximately 2 seconds. However, since the circuit across pins 3 and 4 of plug 350 which is connected to plug 285 is still short circuited by the automatic cam control unit, relay 345 will not affect the operation of the camera control circuit of FIGURE 4*b*. The record paper length control circuit in the camera which will hereinafter be explained, will permit the paper record to run for a time interval determined by the setting of the step switch 360. At the end of this time interval the camera motor will be turned off because condenser 361 has discharged to a point where the condenser voltage cannot maintain relay 362 in the energized position. As relay 362 relaxes, relay 363 is opened. Condenser 361 is then recharged through the normally closed contacts of relay 363. The charging voltage consists of a 6 volt camera battery 366 in series with a 4½ volt battery 367 through lead 368 and 369.

Referring again to the automatic cam control unit of FIGURE 4*a*, when relay 190 is closed by the camera start microswitch 320 (see FIGURE 4*d*) pins 2 and 3 of relay 190 are closed. Since pin 2 of relay 190 was previously made −12 volts by microswitch 71 on the correction cam side, this −12 volts is applied through pins 2 and 3 of relay 190 to pins 1 and 3 of relay 251 through lead 370. And as pin 8 of relay 251 has +12 volts supplied through pins 7 and 13 of relay 197 relay 251 closes. Pins 2 and 3 of relay 251 latch this relay closed. Pin 3 of relay 251 applies −12 volts to pin 4 of relay 371 which is associated with thyratron 373. Contacts 6 and 7 of relay 251 will be discussed hereinafter.

As the camera starts on the moveout record (the start of the first drum revolution) the magnetic tape begins to pass under the magnetic tape heads. As the recorded head alignment pips pass under the selected magnetic head feeding the signal to the automatic cam control unit from its playback amplifier, the head pip thyratron 260 is fired thereby extinguishing the pip light 265. This thyratron closes relay 375 associated therewith in its cathode circuit. The transient voltage appearing across the coil of relay 375 is fed through condenser 377 and lead 378 to pin 6 of plug 317. This transient voltage is then applied through pin 6 of plug 315 and lead 379 to plug 312 which may be seen in FIGURE 4*c*. From plug 312 this transient voltage is then transmitted along lead 319 to the cam indicator galvanometer 549. The galvanometer controls the camera record in a manner well known to the art. Since this trace was previously displaced onto the paper by microswitch 71 on the correction cam side (see FIGURE 4*b*) of the tape transport, the above transient pulse will appear at the instant thyratron relay 375 closes (see FIGURE 4*a*).

As relay 375 closes a positive D.C. voltage is applied to time break thyratron 373 through contacts 4 and 6 of relay 375 and lead 380. The time break indicator light 383 is then turned on. As the recorded time break signal passes into the same selected head the time break thyratron 373 is fired and time break light 383 goes off. The time break thyratron closes relay 371 in its cathode circuit. The transient voltage appearing across the coil of relay 371 is fed through condenser 385 and lead 378 to pin 6 of plug 317 and thence through pin 6 of plug 315 through lead 379 to camera plug 312 and from there to the cam indicator galvanometer 549. Since this trace is still on the paper the second transient pulse is recorded.

When relay 371 closes contacts 4 and 6 of this relay apply −12 volts to pins 1 and 3 of relay 230 in the automatic cam control circuit. Relay 230 closes as pin 8 of this relay connects to +12 volts through pins 2 and 11 of relay 197. As relay 230 closes pin 2 thereof, which is at −12 volts, latches relay 230 closed through pin 3 thereof. Pins 6 and 7 are now closed and pin 7 goes directly to the clutch power supply 211 through lead 395. Pin 6 of relay 230 then feeds pin 7 to relay 251 through lead 396. Since relay 251 is closed and pins 6 and 7 thereof are tied together as previously explained, then pin 6 of this relay feeds pin 14 of relay 197. Since relay 197 is deenergized, pins 14 and 9 thereof are tied together. Pin 9 feeds pin 6 of plug 173 of the automatic cam control unit through lead 398. Pin 6 of plug 173 is connected through plug 160 to pin 6 thereof on the correction cam side, thus energizing the magnetic clutch through lead 228. When the magnetic clutch is engaged the correction cam is rotated with the drum. As the switch cam on the correction cam shaft releases the microswitch 71, the cam indicator galvanometer is deflected off the paper by the opening of the −12 volt circuit. This also turns off the cam maximum indicator light 316.

Correction cam 20 continues to rotate until it reaches the zero moveout position (minimum diameter on the cam). Microswitch 36 (see FIGURES 4*b* and 5) then is closed by movement of the cam follower 15 thus applying −12 volts to pin 4 of plug 229 through lead 401. This −12 volts is then applied to pin 20 of plug 160 through lead 402. Pin 20 of plug 160 then feeds pin 1 of relay 197 through pin 20 of plug 173 and lead 404 connected thereto. This turns off the cam zero light 168. Since relay 197 is now energized, pins 12 and 9 open the positive D.C. voltage applied to the clutch thereby disengaging the clutch and stopping the correction cam at point zero. Pins 13 and 7 of relay 197 are now open, thus de-energizing relay 251 through lead 406. Pins 11 and 2 of relay 197 are now open, which in turn opens relay 230. This prevents the clutch from engaging for the duration of this playback cycle.

The reset microswitch 270 (see FIGURE 4*d*) is again closed by the switch cam. This switch energizes relay 261 in the automatic cam control unit. Relay 11 resets the cam control unit thyratrons 260 and 373 and the master control circuit for the pip record.

As the drum continues to rotate the camera microswitch 320 again closes relay 190 through lead 327, pin 10 of plug 173, pin 10 of plug 160, lead 326, pin 11 of plug 272 and pin 11 of plug 271 through lead 322. Thus, pins 6 and 7 of relay 190 starts the camera pip record. Pins 2 and 3 of relay 190 cannot close relay 251 as it did during the moveout record. As pin 13 and 7 of relay 197 are now open thereby removing the +12 volts from pin 8 of relay 251. The head pip thyratron 260 has been reset and when the head pip signal is received this thyratron will again fire, closing relay 375 as before. This applies a positive D.C. voltage to the time break thyratron 373. As the time break signal is received the time break thyratron will fire closing relay 371. Since relay 251 is de-energized, pin 4 of relay 371 which is coupled to relay 251 through lead 197 is no longer at −12 volts. Therefore, relay 371 does not close relay 230 at this time. Thus, the correction cam remains fixed at a zero position. When the first arrivals of a seismic signal on the tape fire the seismic master control thyratron 260, relay 375 closes. This applies −6 volts to pin 6 of plug 420 and the master control unit. This −6 volts is applied through lead 421 to pin 2 of plug 422 then through pin 2 of plug 423, through lead 424, through pin 4 of plug 315 of the cam control unit, and then to pin 8 of relay 427 of the cam control unit through lead 426. Since pin 1 of relay 427 has already received +6 volts from the master control, relay 427 will close. This opens pins 2 and 4 of this relay which are normally closed and closes pins 2 and 3 thereof. This effectively opens the circuit across pins 25 and 26 of the cam control unit plug 173 through leads 430 and 431. This, in turn, opens the circuit of condenser 361 and relay 362 of the camera automatic playback system of FIGURE 4*a* through leads 450, pin 1 of plug 215 and lead 451. This disables the camera paper length control circuit and stops the camera record just after the first arrivals are recorded. This operation insures that the camera will always be turned off during the pip record by the first seismic arrivals regardless of the time arrival between the start of the tape, the pips, the time break and the first arrivals. It also prevents running a paper record in excess of the amount needed to record the above data.

As relay 427 closes, pins 6 and 7 thereof apply −6 volts to relay 171 through lead 460 which opens relay 170 in approximately two seconds. The tape drum 11 continues to rotate until it reaches the load position and since relay 189 is not closed pin 7 of plug 173 which is connected to pin 3 of relay 189 through lead 461 is not at +12 volts. Therefore pin 12 of plug 151 which is connected to pin 7 of plug 173 through pin 7 of plug 160 through lead 462 is not at +12 volts. Thus, when the switch cam operates microswitch 104 of the tape transport (see FIGURE 4*d*) this switch momentarily energizes the stop relay 140. This opens pins 3 and 4 of relay 140 and removes the +12 volts from pin 13 of relay 121, thus opening relay 121 which in turn opens motor relay 130, thus stopping the drum in the load position. The entire playback operation is now completed.

As the above operation is completed and the tape drum is turned off, all of the relays relax. Relay 195 of the automatic control unit could be momentarily energized by contacts 12 and 5 of relay 197, however. This will cause the magnetic clutch to momentarily engage and draw the correction cam part way up the reset slope because of the drum inertia as the power is removed. This mechanical kick is undesirable. In order to prevent this, an interlock has been utilized through contacts 3 and 4 and 8 and 9 of relay 196. Since relay 196 is energized by the +12 volts when the reproduce switch 180 (FIGURE 4*d*) was momentarily actuated at the start of the tape playback operation, relay 196 will open contacts 3 and 4 and 8 and 9 for a two second time interval thereby preventing relay 195 from energizing the clutch and causing the mechanical kick.

Normally, the seismic master control is in the fire or armed condition when the playback operation is starting. Since the master control will close relay 427 in the automatic cam control unit when it is fired, it will prevent the clutch from engaging because it will energize relay 195. An interlock has therefore been utilized to insure immediate clutch engagement by temporarily de-energizing relay 195. This occurs in the manner now to be explained.

At the start of the tape playback operation the following conditions exist with only the filament switch 165 turned on. Relay 427 remains energized as the seismic control is fired. Relay 197 is energized by the reproduce switch 180 because the correction cam is at zero. Relay 171 is not energized as the reproduce switch is not on. Relay 170 is energized by the 12 volt filament because of the normally closed contacts of relay 171 through lead 208 which is connected to the −12 volt power supply as hereinbefore described.

As the reproduce switch 180 is actuated and the playback operation is started the following conditions exist. Relay 427 remains energized as the master control is still fired. Relay 197 is energized by the reproduce switch because the cam correction is at zero. Relay 171 is energized by the reproduce switch 180 and relay 170 remains energized due to the thermal action of relay 171. Contacts 3 and 4, and 8 and 9 of relay 171 will remain closed approximately another two seconds and then open, thereby de-energizing relay 170. Before the thermal action of relay 171 de-energizes relay 170 and relay 170 is energized this relay prevents relay 195 from closing by removing the −6 volts from pin 12 of relay 197 and therefore since relay 197 is closed it removes −6 volts from pin 5 of relay 197 and also pin 1 of relay 195. Since relay 195 is not closed this permits contacts 2 and 4 of relay 195 to apply positive D.C. voltage to the clutch through contacts 5 and 7 of relay 201. This engages the clutch and drives the correction cam from zero toward the point of maximum movement.

Relay 197 opens as the zero microswitch 36 is opened by movement of the cam follower 15, and contacts 12 and 14 of this relay are connected. Then relay 171 will open contacts 3, 4 and 8 and 9 which de-energize relay 170. The camera stop circuit remains completed because pin 26 of plug 173 is connected to pin 2 of relay 427 and as relay 427 is energized contacts 2 and 3 are closed since relay 170 is de-energized its contact 4 does not affect the circuit on pins 3 and 7 of relay 170. Pin 4 of relay 427 is also tied to pin 4 of relay 197 through lead 480, then to pin 25 of plug 173 completing the camera stop circuit. If the master control is reset, relay 427 will open thus connecting pins 2 and 4 of this relay and since relay 170 is de-energized the camera circuit is now completed as follows: Pin 26 of plug 173 is connected to pin 2 of relay 427 through lead 431. Since relay 427 is de-energized, pin 2 thereof feeds pin 4 from there to pin 3 of relay 170 through lead 490. Relay 170 is de-energized by relay 171 and does not affect the camera stop circuit. This completes the camera stop circuit through pins 2 and 7 of relay 427 back to pin 25 of plug 173.

Therefore, when the master control is fired by the seismic first arrival on the magnetic tape relay 427 is energized which opens contacts 2 and 4 thereof and in turn interrupts the circuit across pins 25 and 26 of plug 173. This stops the camera immediately after the first arrivals are recorded for the pip record.

The operation of the automatic tape playback system of the camera which may be seen in FIGURE 4*b* will now be described. This circuit contains the relay operator RC control paper record length control circuit. Paper lengths are determined by the setting of the step switch 360 in this circuit. The automatic control of the tape playback section of the camera contains a relay operated or remotely controlled automatic tape playback system. This system sequences the operation of the tape, drums, seismic master control and the camera. It consists of three relays, an automatic tape arming switch, a stop switch and three indicator lights. The operation is as follows. The camera light 340 should be turned on. This energizes the paper length circuit. This applies −6 volts through paper stop switch 500 to one side of the automatic tape arming switch 501. As the tape arming switch 501 is actuated −6 volts is applied to pins 1 and 2 of relay 300 through lead 503. Since pin 3 of relay 300 is at −6 volts this relay will remain closed once it is energized. Since pin 8 and the other side of light 225 are at +6 volts due to the normally closed contact of relay 345 the light 225 and relay 300 are energized contacts 6 and 7 of relay 300 applies +6 volts to pin 8 or relay 299 through lead 510. Pin 2 of relay 300 applies −6 volts through pin 5, plug 350 through lead 512 to one side of the reset microswitch 270. When the microswitch is operated by the cam the automatic reset relay 289 in the master control is energized which resets the firing circuit. This in turn applies −6 volts through the normally closed thyratron relay contacts. This −6 volts is applied through pin 2 of plug 288 in the master control through pin 6 of plug 285 in the camera to pin 1 of relay 299, thus closing relay 299. Since −6 volts is applied to one side of the camera start microswitch on the tape drum through pin 3 of plug 350 the camera microswitch closes and −6 volts is applied through pin 4 of plug 350 which illuminates the tape start light 520 indicating the start of the tape drum revolution. Therefore, when relay 299 closes contacts 2 and 3 thereof apply −6 volts to pin 6 of relay 345 and to the camera control line on relay 345. Since pins 1, 8 and 9 are already connected to +6 volts contacts 3 and 4 and 8 and 9 will open approximately two seconds after relay 345 is energized due to the thermal time delay in the relay. The opening of these contacts de-energizes relay 300 turning off arming light 225 and completing the operation cycle.

When voltage is applied on lead 346 from the automatic cam control unit or by closing of moveout switch 550 relay 363 is energized. (It is assumed that camera switch 560 had previously been closed.) With relay 363 thus closed the plus side of condenser 361 is connected through lead 562 to one side of the coil of relay 362. The minus side of condenser 361 is tied through the automatic cam control unit by pin 1 of plug 551 to pin 2 thereof and back over leads 552 and 553 through switch 360 to the other side of the coil of relay 362 holding this relay closed for the desired time.

When relay 362 is closed as above described, condenser 555 is applied across the coil of relay 362 momentarily opening the circuit of the automatic cam control across pins 1 and 2 of plug 551 so that the voltage therefrom does not latch relay 362 closed.

The RC time for the camera is determined by the resistance of switch 360 and the capacitor of condenser 361 which appear in series across the coil of relay 362.

Resistor 556 is in the circuit to preclude the possibility of the shunting of condenser 361 across the coil of relay 362 if switch 360 is set at zero.

Thus, the present invention provides a method and apparatus for automatically introducing time scale calibration and corrections to an input signal at a predetermined time scale relationship to the time origin of the input signal. By means of the present invention time scale calibrations and corrections can be introduced into a multi-channel seismic recording to produce a corrected seismic recording wherein it is possible from the corrected record to determine both the static and dynamic time scale corrections which have been introduced. By means of the present invention such corrections and calibrations are introduced into the corrected record with a minimum amount of time expended and a minimum amount of skill required on the part of the operator.

What is claimed is:

1. In a multi-channel seismographic recording apparatus of the type wherein a reproducible seismographic record is transported past a plurality of detecting transducers to transmit a plurality of input signals to a time scale recording means, means for varying the time scale position of each of said transducers to introduce a time scale calibration and correction to each of said input signals to said recording means, means for detecting an arbitrary time origin in one of said input signals, means for engaging said time scale calibration means at a predetermined time scale relationship to said time origin, said engaging means being actuated by said detecting means.

2. In a multi-channel magnetic reproducing apparatus wherein a multi-channel magnetic time scale record is moved past a plurality of magnetic detecting heads to transmit a plurality of input signals to a multi-channel time scale recording means, means for varying the time scale position of said magnetic heads with respect to said moving magnetic record to introduce a time scale calibration and correction to each of said input signals, means for detecting an arbitrary time origin in one of said input signals, and means for engaging said time scale calibration means at a predetermined time scale relationship to said time origin, said engaging means being actuated by said detecting means.

3. In a multi-channel seismographic magnetic reproducing apparatus wherein a magnetic tape time scale record having a plurality of seismographic signal traces recorded thereon is mounted upon a drum and rotated beneath a corresponding plurality of magnetic detecting heads to transmit a plurality of input signals to a multi-channel time scale recording means; means for varying the time scale position of said magnetic heads with respect to said moving magnetic tape record to introduce a time scale calibration and correction to each of said input signals, means for detecting an arbitrary time origin in one of said signal traces, a magnetic clutch connected to said drum to rotate therewith, and means for actuating said clutch to couple said drum to said time scale calibration means at a predetermined time scale relationship to said time origin as determined by said detecting means.

4. In a multi-channel seismographic magnetic reproducing apparatus wherein a magnetic tape time scale record having a plurality of seismographic signal traces recorded thereon is mounted upon a drum and rotated beneath a corresponding plurality of magnetic detecting heads to transmit a plurality of input signals to a multi-channel time scale recording means; means for varying the time scale position of said magnetic heads with respect to said moving magnetic tape record to introduce a time scale calibration and correction to each of said input signals, means for detecting an arbitrary time origin in one of said signal traces, a magnetic clutch connected to said drum to rotate therewith, means for actuating said clutch to couple said drum to said time scale calibration means at a first predetermined time scale relationship to said time origin, and means for deactuating said clutch at a second predetermined time scale relationship.

5. In a multi-channel seismographic magnetic reproducing apparatus wherein a magnetic tape time scale record having a plurality of seismographic signal traces recorded thereon is mounted upon a drum and rotated beneath a corresponding plurality of magnetic detecting heads to transmit a plurality of input signals to a multi-channel time scale recording means, cam operated means for varying the time scale position of said magnetic detecting heads with respect to said moving magnetic record, said cam defining a time scale function to introduce a time scale calibration and correction to each of said input signals, means for detecting an arbitrary time origin in one of said signal traces, a magnetic clutch connected to said drum to rotate therewith, and means for actuating said clutch to couple said drum to said time scale calibration means at a predetermined time scale relationship to said time origin as determined by said detecting means.

6. In an apparatus for reproducing a seismographic recording having means for applying time scale corrections, automatic programing means comprising: signal detection means operating upon said seismographic recording to detect signals recorded thereon, signal selection means for selecting one specific signal from among a plurality of similar signals detected by said detection means, and actuating means responsive to said selection means for actuating said time scale correction means at a predetermined time subsequent to the detection of said specific signal.

7. In an apparatus for reproducing a multi-channel seismographic recording having means for applying time scale corrections, automatic programing means comprising: signal detection means operating upon said seismographic recording to detect signals recorded thereon, signal selection means for selecting one specific signal in one of said channels from among a plurality of similar signals detected by said detection means, and actuating means responsive to said selection means for actuating said time scale correction means at a predetermined time subsequent to the detection of said specific signal.

8. In an apparatus for making a reproduction of a seismographic recording having means for applying a time scale correction, automatic programing and indicating means comprising: signal detection means operating upon said seismographic recording to detect signals recorded thereon, signal selection means for selecting one specific signal from among a plurality of similar signals detected by said detection means, actuating means responsive to said selection means for actuating said time scale correction means at a predetermined time subsequent to the detection of said specific signal and indicating means for indicating upon said reproduction the time of commencement of application of said time scale correction.

9. In an apparatus for making a reproduction of a multi-channel seismographic recording having means for applying a time scale correction, automatic programing and indicating means comprising: signal detection means operating upon said seismographic recording to detect signals recorded thereon, signal selection means for selecting one specific signal in one of said channels from among a plurality of similar signals detected by said detection means, actuating means responsive to said selection means for actuating said time scale correction means at a predetermined time subsequent to the detection of said specific signal and indicating means for indicating upon said reproduction the time of commencement of application of said time scale correction.

10. In an apparatus for reproducing a multi-channel seismographic recording having means for applying time scale corrections, automatic programing means comprising: signal detection means operating upon selected channels of said multi-channel seismographic recording to detect signals recorded thereon, signal selection means responsive to said detection means for selecting from among a plurality of similar signals one particularly specified signal recorded upon one preselected channel of the said multi-channel recording, and actuating means responsive to said selection means for actuating said time scale correction means at a predetermined time subsequent to the detection of said specified signal.

11. Apparatus for reproducing a time scale corrected multi-channel seismographic record from an uncorrected multi-channel seismographic recording having a time break signal in one channel thereof comprising: a reproducible recording surface, a plurality of detecting transducers in combination wtih said surface having a transducer corresponding to each of said channels, said reproducible recording surface being transported past said detecting transducers at a substantially constant rate of movement; means for introducing time scale corrections and calibrations in each of said channels by shifting the time-scale position of each of said transducers relative to said reproducible surface; signal selection means responsive to the transducer in one of said channels for selecting from among a plurality of similar signals a time break signal recorded upon said one channel; and actuating means responsive to said selection means for actuating said time scale correction means at a predetermined time subsequent to the detection of said time break signal.

References Cited in the file of this patent

UNITED STATES PATENTS

| | | |
|---|---|---|
| 2,440,971 | Palmer | May 4, 1948 |
| 2,604,955 | Hawkins | July 29, 1952 |
| 2,800,639 | Lee | July 23, 1957 |
| 2,838,743 | Fredriksson | June 10, 1958 |